United States Patent [19]
de Goncourt

[11] Patent Number: 4,869,472
[45] Date of Patent: Sep. 26, 1989

[54] CONNECTION DEVICES FOR SPRING SUSPENSION LEAVES OF A VEHICLE AND METHOD FOR INSTALLING SAID DEVICES

[75] Inventor: Louis de Goncourt, Voisins Le Bretonneux, France

[73] Assignee: Bertin & Cie., Plaisir, France

[21] Appl. No.: 203,600

[22] Filed: Jun. 6, 1988

Related U.S. Application Data

[63] Continuation of Ser. No. 889,935, filed as PCT FR85/00314 on Nov. 7, 1985, published as WO86/02887 on May 22, 1986, abandoned.

[30] Foreign Application Priority Data

Nov. 12, 1984 [FR] France ................. 84 17174

[51] Int. Cl.[4] ............ F16F 1/26; B60G 11/02
[52] U.S. Cl. ..................... 267/52; 267/160; 267/260
[58] Field of Search ......... 267/44, 47, 48, 52, 267/260, 261, 262, 158, 160

[56] References Cited

U.S. PATENT DOCUMENTS

| 607,886 | 7/1898 | Schubert | 267/56 |
|---|---|---|---|
| 740,809 | 8/1903 | Conlee | 267/52 X |
| 762,977 | 6/1904 | Arnold | 267/261 |
| 1,774,503 | 9/1930 | Davis | 267/47 X |
| 1,826,575 | 10/1931 | Rumney | 267/48 |
| 1,876,924 | 9/1932 | Hastings et al. | 267/261 |
| 3,079,138 | 2/1963 | Vogt et al. | 267/47 |
| 4,460,167 | 7/1984 | Silvis et al. | 267/261 X |
| 4,557,500 | 12/1985 | Collard et al. | 267/47 X |

FOREIGN PATENT DOCUMENTS

| 0093532 | 5/1984 | Japan | 267/260 |
|---|---|---|---|
| 0250781 | 4/1926 | United Kingdom | 267/47 |
| 0686725 | 1/1953 | United Kingdom | 267/262 |
| 2100835 | 1/1983 | United Kingdom | 267/47 |

Primary Examiner—Andres Kashnikow
Assistant Examiner—Richard Potosnak
Attorney, Agent, or Firm—A. W. Breiner

[57] ABSTRACT

This invention is directed to an improved device for connecting an elastic suspension leaf arranged between a load and a carrier, particularly of a vehicle, to the walls or the like and to the chassis. The suspension leaf comprises a composite material having in its vertical plane of symmetry a thickness increasing from the chassis to the end support of the wheel, its cross-section remaining approximately constant. At least one device for connecting to the chassis includes a lower part which retains the leaf and which has a trapezoidal shape in projection in a horizontal plane and a U-shaped cross-section in a vertical plane, and a semi-cylindrical upper part possessing an axial bore which receives a shock-absorbing device for fastening the device to the assembly. The dimensions of the lower part ensure that the part fits onto the gradually varying shape portion of the leaf at the fastening points of the leaf. This device, inter alia, utilizes the progressively varying shape of the elastic leaf to provide an enhanced assembly.

10 Claims, 3 Drawing Sheets

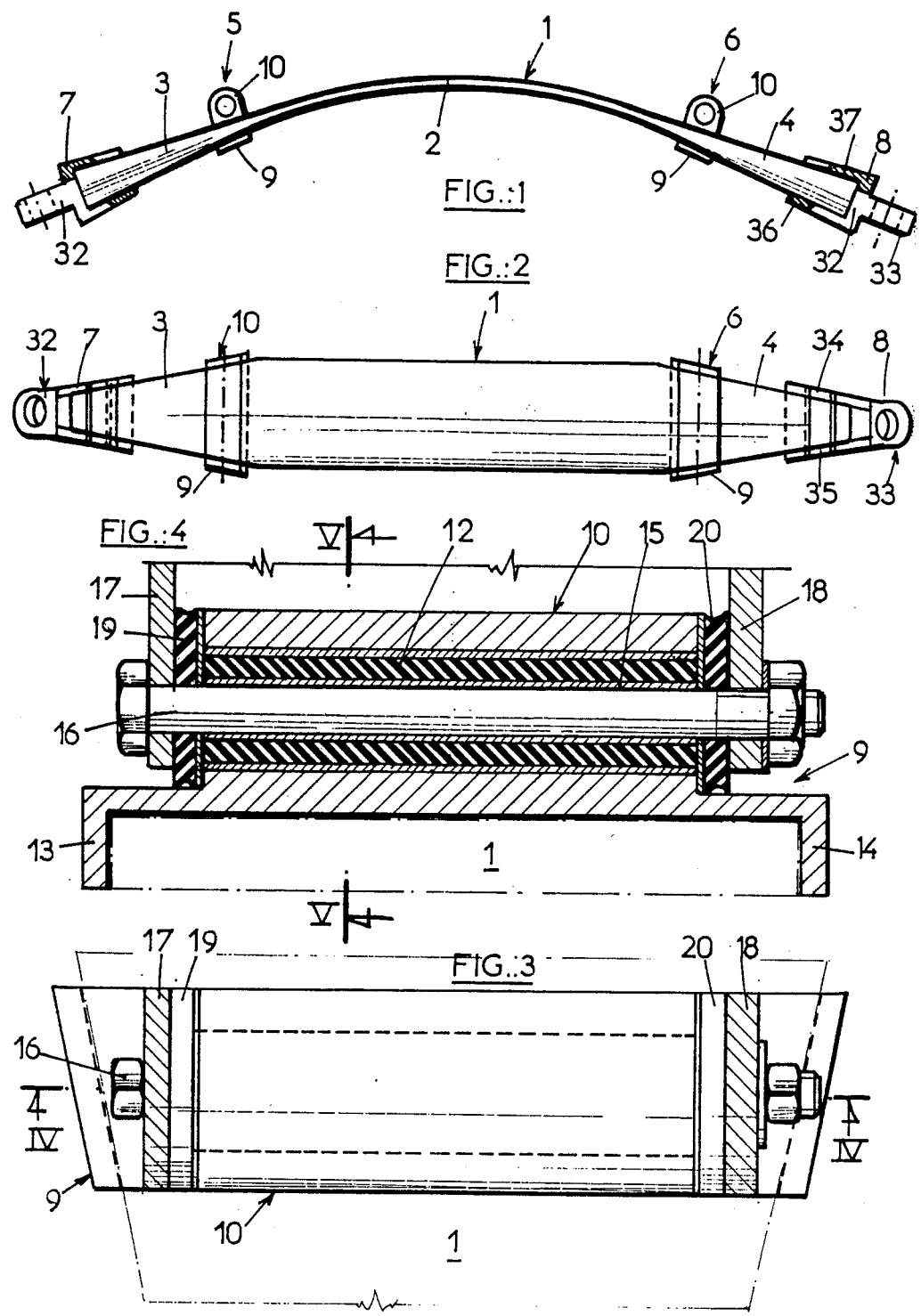

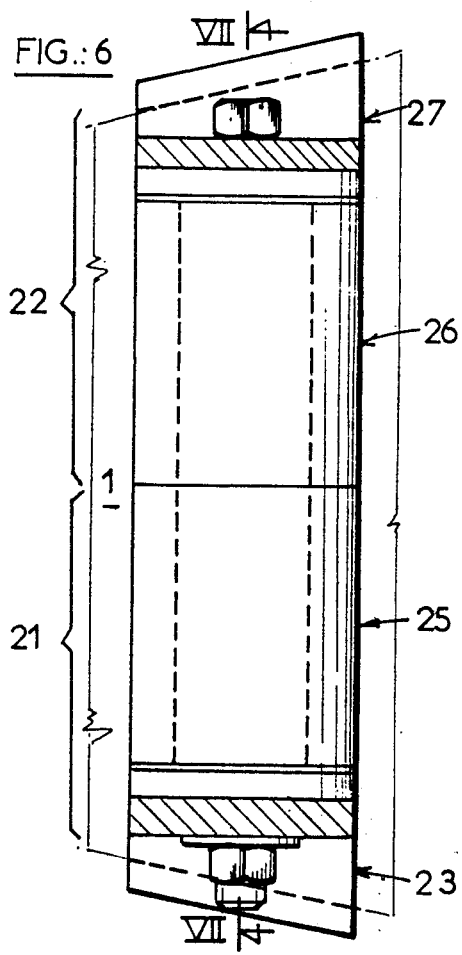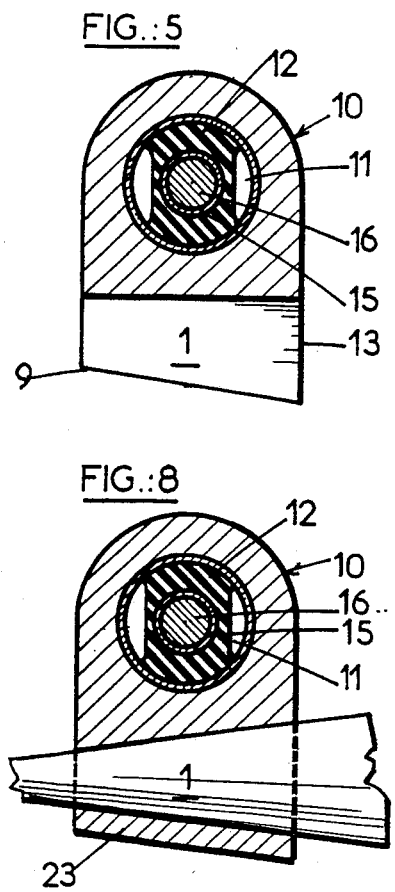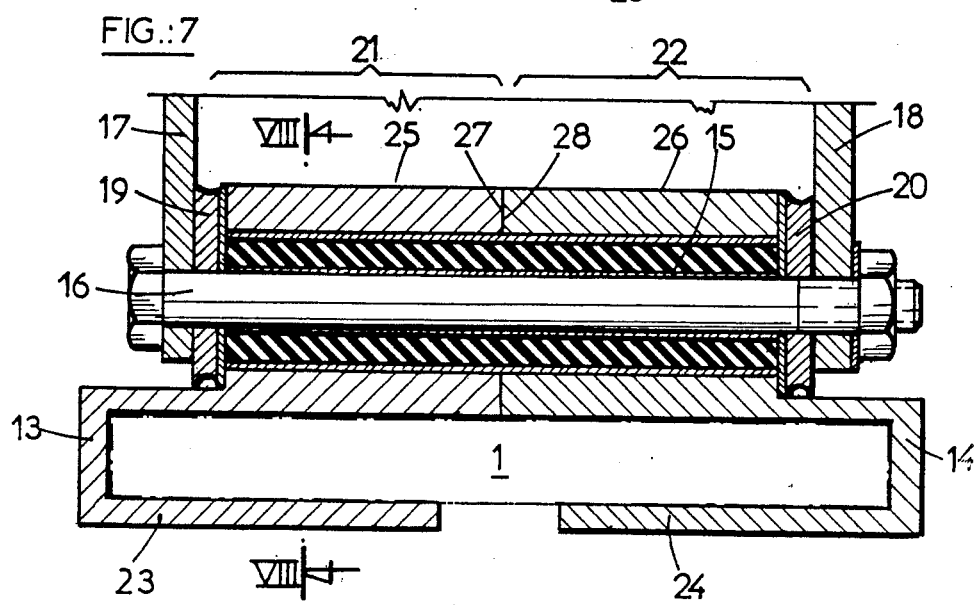

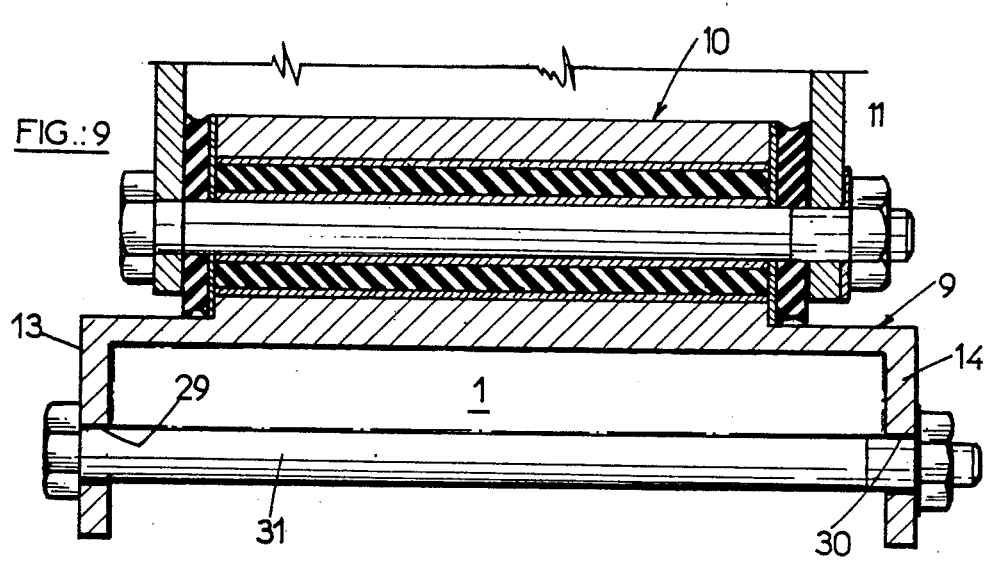
FIG.: 9
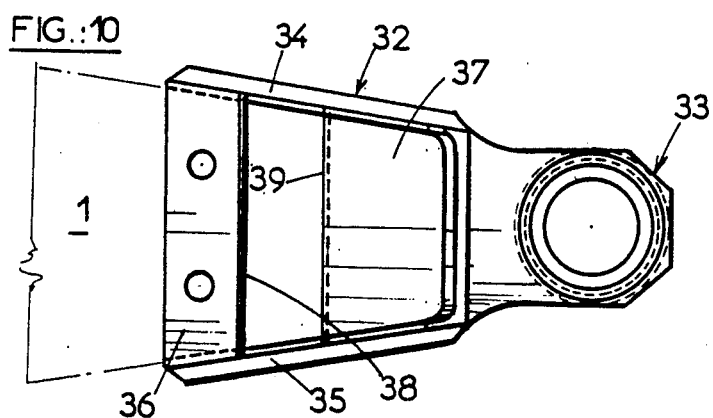
FIG.: 10
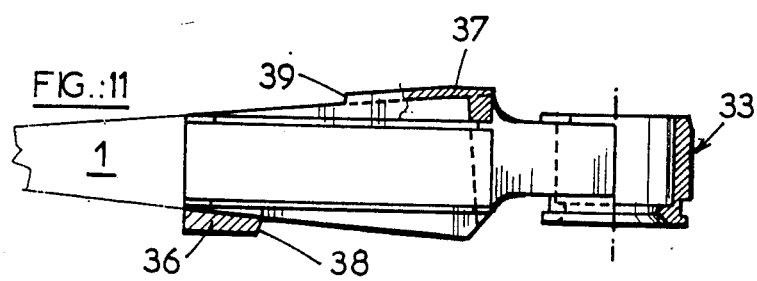
FIG.: 11

CONNECTION DEVICES FOR SPRING SUSPENSION LEAVES OF A VEHICLE AND METHOD FOR INSTALLING SAID DEVICES

This application is a continuation of application Ser. No. 889,935, filed as PCT 85/00314 on Nov. 7, 1985, published as WO86/02887 on May 22, 1986, now abandoned.

The invention relates to devices for connecting an elastic suspension leaf arranged between a load and a carrier, particularly of a vehicle, to the wheels or the like and to the chassis, the said leaf consisting of a composite material having, in its vertical plane of symmetry, a thickness increasing from the chassis to the end supporting the wheel, its cross-section remaining approximately constant, and to a process for installing the said devices.

French Pat. No. 2,516,455 describes a vehicle suspension using an elastic leaf. The leaf formed from a composite material has, in its vertical plane of symmetry and over at least some of its length, a thickness increasing towards one of its ends and, in a horizontal plane a decreasing width, its cross-section remaining constant from one end to the other. Devices for connecting the leaf to the wheel support and to the chassis are described in it. Thus, the connexion of the wheel support to the thick end of the leaf consists of a metal insert, in which there is a seat interacting with the spherical end of the hub-axle spindle fastened to the wheel hub axle and to the end of the shock-absorber leg. According to another example, the end of the leaf is gripped in a receptacle of a metal piece having a bore which receives the hub-axle spindle. According to the patent mentioned, the connexion between the leaf and the chassis comprises a holder, in which a parallelepiped part of the leaf is retained by physicochemical or mechanical means. This holder is fastened to the chassis by means of an elastomeric block having special elastic characteristics.

Although satisfactory, these devices, because the fibers of the material of the elastic leaf are severed for the passage of the inserts and pins, have to be given larger dimensions in order to achieve suitable transmission of the forces. Despite this compensation, the fatigue strength is reduced significantly, and this is a handicap.

To avoid the above-described disadvantages, the invention is aimed at providing devices for connecting to wheels or the like (skis, tracks, bearings, etc.) and to the chassis, which do not make severing necessary, or an arrangement of the fibers which takes account of the inserts or pins, at the same time utilizing the evolute shape of the elastic leaf. "Evolute shape," as used herein, means that the shape is developing gradually or progressively varying, i.e., based on the word "evolve" or "evolving."

The devices according to the invention are notable in that at least one device for connecting to the chassis consists of a lower part which retains the leaf and which has a trapezoidal shape in projection in a horizontal plane and a U-shaped cross-section in a vertical plane, and of a semi-cylindrical upper part possessing axially a bore which receives a shock-absorbing device for fastening the device to the chassis, the dimensions of the lower part being intended to ensure that the said part fits onto the evolute part at the fastening points of the leaf.

The device for connecting to a wheel consists of a holder, at one end of which a seat is provided for a hub-axle spindle, the said holder consisting of two trapezoidal side plates which, in projection in a horizontal plane, form a truncated V, the end of which carries the seat, the said two plates being connected at the lower edge of their free parts by means of a bar and in their upper part adjacent to the seat by means of a stop, the distance separating the edge of the lower bar from the edge of the upper stop being at least equal to the thickness of the end of the suspension leaf, and the dimensions of the inner space defined by the holder corresponding approximately to the dimensions of the end of the leaf so that the latter can be accommodated in it.

The explanations and Figures given below by way of example will make it possible to understand how the invention can be put into practice.

FIG. 1 shows a side view of a suspension leaf equipped with devices according to the invention.

FIG. 2 is a plan view of the leaf of FIG. 1.

FIG. 3 is a plan view of a first exemplary embodiment of a device connecting a suspension leaf to the chassis.

FIG. 4 is a sectional view according to IV—IV of FIG. 3.

FIG. 5 is a sectional view according to V—V of FIG. 4.

FIGS. 6, 7 and 8 are respectively plan and sectional views of a second example of a device for connecting to a chassis.

FIG. 9 is a sectional view of a third exemplary embodiment of a device for connecting to a chassis.

FIGS. 10 and 11 are respectively a plan view and a side view, partially in section, of a device for connecting a suspension leaf to the wheels.

FIGS. 1 and 2 show an elastic suspension leaf 1 in a side view and a plan view. This leaf, as described in French Pat. No. 2,516,455, consists of a composite material formed from mineral or organic fibers which extend, without being cut, from one end of the leaf to the other and which are embedded in a suitable binder. This leaf has a parallelepipedal central part 2 connected to two end parts 3, 4 of evolute shape which, in the horizontal plane (FIG. 2), have a reduction in width accompanied by an increase in thickness in the vertical plane (FIG. 1), the cross-section remaining approximately constant.

The positions of the devices 5, 6 connecting the suspension leaf 1 to the chassis and the ends of the leaf to the wheels 7, 8 are indicated diagrammatically. The connecting devices are arranged in an evolute region of the leaf, so as to benefit from the fact that its faces are non-parallel, in order to ensure locking.

At least two cases can be envisaged. In the first case, the suspension leaf is subjected to a prestress when mounted on the chassis or the vehicle body (because its movement is limited by the shock-absorber). This applies to automobiles where the forces in the vertical plane (weight, pull away, roll) vary little and where the leaf remains constantly up against its supports.

In a second case, the suspension leaf is subjected to practically no prestress at all or is subjected to a prestress below the maximum forces in the vertical plane. This applies, for example, to trailers and rear attachments of light trucks. The leaf risks coming away from its supports and it is then necessary to provide means preventing this detachment.

One embodiment of a device for connecting a suspension leaf to the chassis of a vehicle, designed more particularly for a leaf subjected to a prestress, is illustrated in FIGS. 3 to 5. The device, which will be described below, is arranged in the position of the device 6 of FIGS. 1 and 2, that is to say on the leaves supporting the right wheels of the vehicle.

According to the exemplary embodiment, the device comprises a lower part 9 retaining the suspension leaf 1, the said part having a trapezoidal shape in projection in a horizontal plane and a U-shaped cross-section in a vertical plane, the axis of symmetry of the U being vertical, and a semi-cylindrical upper part 10 possessing axially a bore 11 which receives a shock-absorbing device 12, for fastening the device to the chassis and serving for transmitting vertical and horizontal forces.

The vertical wings 13 and 14 (FIG. 5) of the U form trapezoidal sides, the large base of which is located on the same side as the small base of the horizontal part of the U. The dimensions of the large bases and small bases of the horizontal and vertical sides of the part 9 have approximately the dimensions of the corresponding cross-sections at the fastening points of the suspension leaf.

The shock-absorber 12 carries, along its axis, a liner 15 which receives a pin 16 retained at its two ends in mountings 17, 18 integral with the body or the chassis.

In a known way, the semi-cylindrical part 10 is centered relative to the mountings by means of shock-absorbers 19, 20 which absorb the front/rear forces.

The connecting device designated by the reference 5 in FIGS. 1 and 2 is similar in all respects to that described above, but is arranged symmetrically relative to the longitudinal axis of the vehicle.

The connecting devices are positioned in such a way that when the leaf is prestressed, with the vehicle being at rest under a medium load, the wings of the lower parts are in contact with the sides of the leaf. When the suspension is subjected to forces, the curvature of the leaf decreases, the effect of which is to increase the distance between the retention points and therefore between the devices. The devices, since they are retained by the pins, can only rotate about these through a small angle. Self-locking between the leaf and the devices occurs, and this prevents any lateral slip.

The forces to which the leaf is subjected are transmitted directly to the devices, without the need for an intermediary, as is the case in the devices of the prior art where the forces are transmitted via a connexion between the leaf and the connecting device, such as an adhesive bond, vulcanization or a mechanical connecting member (pins, bolts, etc.).

A second embodiment of a connecting device according to the invention is illustrated in FIGS. 6 to 8. The elements similar to those of the preceding device bear the same references.

The connecting device consists of two symmetrical pieces 21, 22, each having a lower part 23, 24 and an upper part 25, 26.

The lower part 23 or 24 retaining the leaf 1 has, in projection in a horizontal plane, the form of a right trapezoidal and, in a vertical plane, a U-shaped cross-section with asymmetric branches, the axis of symmetry of the U being horizontal.

The upper part 25 or 26 is similar in all respects to that described in the preceding example and extends over the corresponding lower part 23 or 24.

The two pieces 21, 22 are arranged on the edges of the leaf 1 and are clamped in such a way that their corresponding plane faces 27, 28 come in contact, part of the suspension leaf then being enclosed almost completely in a trapezoidal holder, of which the rectangular bases of the same area, perpendicular to the leaf, have perpendicular longitudinal axes.

These connecting devices ensure, on a leaf such as that illustrated in FIGS. 1 and 2, double self-locking attributable to the shape of the devices on the one hand and to their opposing arrangement on the other hand.

As a result of the self-locking already obtained with a single device, the latter can advantageously be used for suspension leaves which support only one wheel and which correspond approximately to a half-leaf, such as that shown in FIG. 2.

According to a third embodiment of a connecting device illustrated in FIG. 9 and closely resembling the first embodiment according to FIGS. 3 to 5, the wings 13 and 14 are extended downwards and are provided with matching orifices 29, 30, through which passes a retention means 31, for example a pin, fastened at its ends by bolts or any other means. This pin retains the suspension leaf between the wings of the lower part and prevents it from coming away, and the distance separating the horizontal part of the U from the generatrix of the pin adjacent to the said part is approximately equal to the thickness of the leaf at the point in question.

This device can be used with leaves without prestress.

The elements of this device which are similar to those of the devices described above bear the same references.

FIGS. 10 and 11 illustrate an embodiment of a device for connecting a leaf end to a wheel, such as those shown diagrammatically at 7 and 8 in FIGS. 1 and 2.

The device consists of a holder 32, on one end of which a seat 33 is provided for the hub-axle spindle (not shown). The holder consists of two trapezoidal side plates 34, 35 which, in projection in a horizontal plane (FIG. 10), form a truncated V, the end of which carries the seat. The two plates are connected by means of a bar 36 at the lower edge of their free parts and by means of a stop 37 in their upper part adjacent to the seat 33. The distance separating the edge 38 of the lower bar 36 from the edge 39 of the upper stop 37 is at least equal to the thickness of the end of the suspension leaf.

The dimensions of the inner space which is defined by the holder 32 correspond approximately to the dimensions of the end of the leaf, so that when the said end is accommodated in the holder, it can only be removed from it by being rotated nearly 90° about a horizontal axis perpendicular to the vertical plane of symmetry of the leaf.

The vertical forces are transmitted to the leaf by the bar and the stop, and the transverse and torsional forces are transmitted by the plates.

The shape of the leaf causes self-locking, the effect of which is added to that of the prestress. The arrangement of the bar 36 and of the stop 37 make it possible, if appropriate, to coat on a film of glue which can be compressed without sliding, when the leaf is mounted, and which thus makes it possible to obtain a uniform fastening.

The forces transmitted outwards are absorbed by the vertical part of increasing thickness of the end of the leaf being clamped against the bar and the stop, and the forces transmitted inwards are absorbed by the trapezoidal plates of the device being clamped against the vertical sides of the leaf which diverge towards the axis of the vehicle.

I claim:

1. A self-locking device for connecting an elastic suspension leaf to a load or to a carrier comprising in combination an elastic suspension leaf and a leaf holder, said leaf having at least one part of progressively varying shape, the cross-sectional width and thickness of which vary conversely along its length, and said leaf holder comprising two non-parallel lateral flanges diverging along one longitudinal direction and resting on the sides of said leaf part to prevent relative displacement of said leaf holder on said leaf part along said longitudinal direction; a third flange resting on a first face of said leaf part, said third flange extending between said sides of said leaf part at a slant to accommodate said first face of said leaf part; and a fourth member engaging a second face of said leaf part which is opposite said first face of said leaf part to prevent relative displacement of said leaf holder on said leaf along the opposite longitudinal direction thereof, thereby constituting a self-locking configuration to maintain the structural integrity of said leaf.

2. The self-locking device according to claim 1 for a suspension leaf made of composite material including continuous fibers which extend from end to end of the leaf, wherein said flanges of said device provide large contact surfaces with said leaf part for directly transmitting forces without the need of position connection means extending through said leaf thereby maintaining the continuity of said fibers.

3. The self-locking device according to claim 1 wherein said holder is connected to an intermediate part of said leaf, and said holder is composed of at least two separate parts.

4. The self-locking device according to claim 2 wherein said holder is connected to an intermediate part of said leaf, and said holder is composed of at least two separate parts.

5. The self-locking device according to claim 3 wherein said holder is made of two laterally symmetrical pieces.

6. The self-locking device according to claim 4 wherein said holder is made of two laterally symmetrical pieces.

7. The self-locking device according to claim 3 wherein said holder includes as a fourth member a bolt interconnecting said lateral flanges.

8. The self-locking device according to claim 4 wherein said holder includes as a fourth member a bolt interconnecting said lateral flanges.

9. The self-locking device according to claim 1 wherein said holder is connected to an end part of said leaf, and said fourth member of said holder is a fourth flange, and said third flange and said fourth flange are longitudinally spaced for enabling clamping of said device on said leaf end part through rotation of nearly 90 degrees about a transverse axis.

10. The self-locking device according to claim 2 wherein said holder is connected to an end part of said leaf, and said fourth member of said holder is a fourth flange, and said third flange and said fourth flange are longitudinally spaced for enabling clamping of said device on said leaf end part through rotation of nearly 90 degrees about a transverse axis.

* * * * *